United States Patent Office
3,248,454
Patented Apr. 26, 1966

3,248,454
STORAGE STABLE POLYURETHANES WITH A DI-4 AMINOPHENYL METHANE DERIVATIVE
Erwin Müller, Leverkusen, and Wilhelm Kallert, Cologne-Stammheim, Germany, assignors to Farbenfabriken Bayer Aktiengesellschaft, Leverkusen, Germany, a German corporation
No Drawing. Filed Dec. 5, 1961, Ser. No. 157,617
Claims priority, application Germany, Dec. 15, 1960, F 32,760
9 Claims. (Cl. 260—858)

This invention relates to polyurethane elastomeric plastics and a method of preparing the same. More particularly, it relates to hard polyurethane plastics having a high rebound elasticity.

In copending application Serial No. 842,211, now Patent No. 3,170,003, a process is described for preparing a polyurethane plastic having an appreciable rebound elasticity, a relatively high breaking elongation, a high elasticity modulus and a high hardness factor. In accordance with that process a storage stable intermediate having terminal active hydrogen atoms is reacted with an organic polyisocyanate while adding an organic compound containing active hydrogen atoms and a molecular weight of less than 500. The polyisocyanate in the reaction mixture is in excess of the quantity necessary to react with all of the active hydrogen atoms present. The storage stable intermediate used in the foregoing reaction is prepared by reacting a first organic compound containing active hydrogen atoms which are reactive with isocyanate groups, the molecular weight of which is at least about 1,000 and a second organic compound having at least two active hydrogen atoms which are reactive with isocyanate groups having a molecular weight of less than about 500, with a deficiency of an organic diisocyanate. This process produces products having the properties set forth, however, until the present time a polyurethane plastic having a high hardness and a rebound elasticity greater than 40% has not been available.

It is an object of this invention to provide improved polyurethane plastics. It is another object of this invention to provide very hard polyurethane plastics having a rebound elasticity greater than 40%. It is still another object of this invention to provide a method of preparing very hard polyurethane plastics having a rebound elasticity greater than 40%.

The foregoing objects and others are accomplished in accordance with this invention generally speaking by providing a very hard polyurethane elastomeric plastic having a rebound elasticity higher than 40% by reacting a storage stable intermediate containing active hydrogen atoms and prepared by reacting a first organic compound containing active hydrogen atoms as determined by the Zerewitinoff test, said active hydrogen atoms being reactive with —NCO groups, said first organic compound having a molecular weight of at least about 1,000, a second organic compound containing active hydrogen atoms as determined by the Zerewitinoff test, said active hydrogen atoms being reactive with —NCO groups, said second organic compound having a molecular weight less than 500 with an organic diisocyanate in an amount less than that required to react with all of the active hydrogen atoms present in the first and the second organic compounds and reacting this storage stable intermediate with a di-(4-aminophenyl) methane derivative having the formula

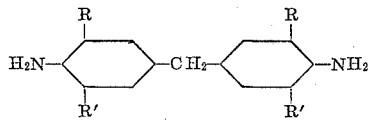

wherein R is an alkyl radical having from 1 to 4 carbon atoms and R' is a halogen atom and an organic polyisocyanate in an amount sufficient to react with all of the active hydrogen atoms present in the storage stable intermediate and the di-(4-aminophenyl)-methane derivative. Thus, the invention contemplates the preparation of a storage stable intermediate using active hydrogen containing compounds and a deficiency of an organic diisocyanate in the first step with a di-(4-aminophenyl)-methane derivative and an excess of an organic polyisocyanate in the second step to achieve elastomeric products having a high hardness and a rebound elasticity higher than 40%.

The quantity of the polyisocyanate added in the second step should be in excess of the quantity necessary to react with the total active hydrogen atoms present and should be in an amount of from about 40 to about 200 mol percent of that necessary to react with all the active hydrogen atoms present. The organic polyisocyanate and the di-(4-aminophenyl)-methane derivative are added to the storage stable intermediate containing active hydrogen atoms while working the intermediate in a suitable blending apparatus such as, rollers similar to that used in the rubber industry.

The di-(4-aminophenyl)-methane derivative is used in an amount of from about 5% to about 80% by weight and preferably in an amount of from about 10% to about 50% by weight calculated on the amount of the storage stable intermediate.

In accordance with this invention, the organic compound containing active hydrogen atoms which are reactive with isocyanate groups and having a molecular weight of at least about 1000 can be any organic compound such as, for example, hydroxyl polyesters, polyhydric polyalkylene ethers, polyhydric polythioethers, polyester amides, polyacetals, and organic compounds containing activated methylene groups. These compounds should have an hydroxyl number of from about 30 to about 150 and an acid number less than about 4.

Any suitable hydroxyl polyester may be used such as, for example, those produced by the thermal condensation of a polycarboxylic acid and a polyhydric alcohol. Any suitable polycarboxylic acid may be used such as, for example, succinic, oxalic, adipic, methyladipic, sebacic, glutaric, pimelic, azelaic, suberic, and the like; aromatic carboxylic acids including phthalic, terephthalic, isophthalic, 1,2,4-benzene tricarboxylic, and the like; sulphur containing acids such as, for example, thiodiglycolic, thiodipropionic and the like; unsaturated acids such as, for example, maleic, fumaric, itaconic, citraconic, and the like. Any suitable polyhydric alcohol may be used such as, for example, ethylene glycol, diethylene glycol, propylene glycol, 1,3-butylene glycol, 1,6-hexene diol, trimethylol propane, pentaerythritol, glycerine, diethanolamine and the like.

Any suitable polyhydric polyalkylene ether may be used, such as, for example the product obtained by polymerizing alkylene oxides or the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexane diol, hexane triol, and the like. Any suitable alkylene oxide may be used such as, for example, ethylene oxide, propylene oxide, butylene oxide, amylene oxide, and the like. The polyhydric polyalkylene ethers may be prepared by any known process such as, for example, the process described in Wurtz in 1859 and in "Encyclopedia of Chemical Technology" volume 7, pages 257 to 262 published by Interscience Publishers, Inc. (1951), or in U.S. Patent 1,922,459.

Any suitable polyhydric polythioether may be used such as, for example, the reaction product of one of the aforementioned alkylene oxides used in the preparation of polyhydric polyalkylene ethers with a thioether glycol such as, for example, thiodiglycol, 3,3′-dihydroxypropyl sulfide, 4,4′-dihydroxybutyl sulfide, 1,4-(β-hydroxyethyl) phenylene dithioether and the like.

Any suitable polyester amide may be used such as, for example, the reaction product of an amine and/or amino alcohol with a carboxylic acid. Any suitable amine such as, for example, ethylene diamine, propylene diamine, and the like may be used. Any suitable amino alcohol, such as, for example aminoethyl alcohol, aminopropyl alcohol and the like may be used. Any suitable polycarboxylic acid may be used such as, for example, those more particularly disclosed above for the preparation of hydroxy polyesters.

Any suitable polyacetal may be used such as, for example, the reaction product of an aldehyde and a polyhydric alcohol. Any sutiable aldehyde may be used such as, for example, formaldehyde, paraldehyde, butyraldehyde, and the like. Any of the polyhydric alcohols mentioned above in the preparation of the hydroxyl polyesters may be used.

Any suitable organic compound containing activated methylene groups may be used such as, for example, compounds containing enolizable hydrogen atoms, such as, for example, aceto acetic ester, diethyl malonate, methyl-m-butyl malonate, acetyl acetone, and the like.

The only requirement necessary for the compounds containing active hydrogen atoms which are reactive with isocyanate groups is that the compound has a mean molecular weight of from about 1000 to about 5000 and preferably from about 1500 to about 2500.

In accordance with the invention, any organic compound containing at least two active hydrogen atoms reactive with isocyanate groups and having a molecular weight of less than about 500 may be used in the first step of the procedure in the preparation of the storage stable intermediate. The active hydrogen atoms may be present as —OH,

—NH₂ or —COOH groups. Examples of such compounds included such as, for example, glycols containing urea groups such as, for example, the reaction product of 1 mol of urea with 2 mols of ethylene oxide, the reaction product of 1 mol oxazolidone with 1 mol of ethanolamine, the reaction product of 1 mol of diethanolamine with 1 mol of potassium cyanate, glycols containing urethane linkages such as, for example, the reaction product of one of the aforementioned compounds containing active hydrogen containing groups, which groups are reactive with isocyanate groups with a deficiency of polyisocyanate, glycols containing carbonamide groups such as, for example, the reesterification product of 1 mol of the ethanol-bis-ester of adipic acid with 2 mols of ethanolamine, glycols containing ester groups such as, for example, the reaction product of a polycarboxylic acid with an excess of a polyhydric alcohol and compounds containing tertiary nitrogen atoms such as, for example, triethanolamine, tripropanolamine and the like. Other compounds suitable for use as the organic compound containing active hydrogen atoms reactive with isocyanate groups and which have a molecular weight less than about 500 include water, simple glycols, such as, for example ethylene glycol, propylene glycol, butylene glycol, amylene glycol, trimethylol propane, glycerine, pentaerythritol, hexane triol, and the like; glycols having aromatic ring systems such as, for example, 1,5-naphthalene-β-dihydroxyethyl ether, hydroquinone-β-dihydroxyethyl ether, and the like; diamines such as, for example, o-dichlorobenzidine, 2,5-dichloro-p-phenylene diamine, 3,3′-dichloro-4,4′ - diamino-diphenylmethane, hydrazine; amino alcohols such as, for example, ethanolamine, diethanolamine, triethanolamine, and the like; amino carboxylic acids such as, for example, β-aminopropionic acid, piperidic acid, glycine, m-aminobenzoic acid, aminobenzoic acid, aminosuccinic acid, anthranilic acid and the like; and hydroxy carboxylic acids such as, for example β-hydroxy-propionic acid, α- and β-hydroxy butyric acids, m-hydroxy benzoic acid, p-hydroxy-benzoic acid, salicyclic acid and the like. It is preferred that the mol ratio of the organic compound having a molecular weight less than 500 to the organic compound having a molecular weight greater than 1000 is from about 0.5 to about 10.

Any suitable diisocyanate may be used in the preparation of the storage stable intermediate product such as, for example, 4,4′-diphenylmethane diisocyanate, the substitution products of 4,4′-diphenylmethane diisocyanate such as, for example, diphenyldimethylmethane-4,4′-diisocyanate, 2,4-tolylene diisocyanate, 2,6-tolylene diisocyanate, m-phenylene diisocyanate, p-phenylene diisocyanate, 1,4-naphthylene diisocyanate, 1,5-naphthylene diisocyanate, diphenyl-4,4′-diisocyanate, azo-benzene-4,4′-diisocyanate, diphenyl sulfone-4,4′-diisocyanate, dicyclohexane-4,4′ - diisocyanate, tetramethylene diisocyanate, hexamethylene diisocyanate and the like. It is to be understood that any suitable diisocyanate may be used including diisocyanates containing substituted urea groups such as, for example, the reactions product of 2 mols of 2,4-tolylene diisocyanate with 1 mol of water.

The storage stable intermediate reaction product is prepared by reacting an organic compound containing active hydrogen atoms reactive with isocyanate groups and having a molecular weight of at least about 1000, an organic compound containing at least two active hydrogen atoms reactive with isocyanate groups and having a molecular weight of less than about 500 with a deficiency of a diisocyanate. The storage stable intermediate may be prepared, for example, by reacting the organic compound having a molecular weight of at least about 1000 with a quantity of a diisocyanate less than that calculated to react with the active hydrogen atoms of the compound having a molecular weight of at least about 1000, admixing the reaction product of the diisocyanate and the organic compound having a molecular weight of about 1000 with the organic compound having a molecular weight of less than about 500 and completing the reaction with an additional amount of diisocyanate. The reaction to prepare the storage stable intermediate product may also be carried out by reacting an excess of a suitable diisocyanate with the organic compound having a molecular weight of at least about 1000 and subsequently admixing therewith a quantity of the compound having a molecular weight of less than about 500, which quantity is at least sufficient to react with all of the isocyanate groups present.

In accordance with the invention, the storage stable intermediate is worked on a suitable apparatus such as, for example, a mixing roller or a kneader, while from about 5% to about 80% by weight of a di-(4-aminophenyl)-methane derivative having the formula set forth above and a quantity of an organic polyisocyanate in excess of the quantity necessary to react with all of the active hydrogen atoms present in both the storage stable intermediate and in the di-(4-aminophenyl)-methane derivative are added thereto. The resulting millable composition can then be fabricated under heat and pressure into the desired configuration.

Any suitable di-(4-aminophenyl)-methane derivative may be used in the practice of this invention such as those prepared by condensing two mols of the corresponding monoamine with one mol of formaldehyde. In the formula set forth above, the aliphatic substituent represented by R may be an aliphatic radical such as, for example, methyl, ethyl, propyl, butyl, isopropyl, isobutyl and the like and the halogen radical represented by R′ may be chlorine, bromine, fluorine, iodine and the like. As stated above, these compounds can be prepared by condensing two mols of the corresponding amine with formaldehyde. Any suitable amine which will yield a composition within the formula set forth may be used such as, for example, 2-methyl-6-chloroaniline, 2-ethyl-6-chloroaniline, 2-propyl-6-chloroaniline, 2-isopropyl-6-bromoaniline, 2-tertiary butyl-6-iodoaniline, 2-propyl-6-fluoraniline, 2-methyl-6-bromoaniline, 2-n-butyl-6-chloroaniline, 2-ethyl-6-bromoaniline, 2-isobutyl-6-chloroaniline and the like.

Any suitable polyisocyanate may be used in the second step of the reaction with the storage stable intermediate such as, for example, the diisocyanates set forth above for use in the preparation of the storage stable intermediate, the dimerization and trimerization products of any of the above mentioned aromatic diisocyanates such as, for example, 2,4-tolylene diisocyanate and 1-chloro-2,4-phenylene diisocyanate, the higher functional isocyanates such as, for example, triphenylmethane-4,4',4'''-triisocyanate, 2,4,6-tolylene triisocyanate, the reaction product of one mol of trimethylol propane with three mols of tolylene diisocyanate, benzene-1,2,4-triisocyanate, tetraphenylmethane-4,4',4'',4'''-tetraisocyanate and the like.

The products obtained by the process of this invention exhibit properties such as, a high modulus, a high degree of hardness, a high breaking elongation, and also a rebound elasticity which is higher than 40%. This combination of properties, that is, the high hardness factor and the high rebound elasticity is unusual in polyurethane plastics. The products are suitable for use as machine components and constructional elements such as, for example, the product of shock absorbing bearings and bearings which can withstand heavy loads, gear wheels for silent running, roller linings, high pressure hoses and the like. Further, these articles may be produced economically by extrusion techniques without the necessity for reinforcements.

The invention will be further illustrated by the following examples in which parts are by weight unless otherwise specified.

EXAMPLE 1

*Production of the starting material*

About 1000 parts of a polyester prepared by condensing 1.1 mols of ethylene glycol and 1 mol of adipic acid to an hydroxyl number of 56 and a molecular weight of about 2000 are mixed with about 50 parts of 1,4-butylene glycol at about 70° C. Thereafter, by means of a high-speed stirring device, about 12.8 parts of tolylene diisocyanate are incorporated and the composition is thoroughly reacted for about 24 hours at about 60° C. A viscous product results, which at somewhat elevated temperature, revolves on a mixing roller as a smooth sheet. This product has unlimited storability.

About 500 parts of the storable reaction product are uniformly mixed within about 5 minutes with about 136 parts of 4,4'-diamino-3,3'-dimethyl-5,5-dichlorodiphenyl methane using a mixing roll stand which is usual in the rubber industry. About 144 parts of diphenylmethane-4,4'-diisocyanate are thereafter admixed therewith. The operation lasts for 4 minutes. Due to the heat of mastication, the mixture assumes a temperature of 55° C. It is drawn out as a smooth sheet with a thickness of about 7 mm., rough elements are stamped out for placing in pressure molds and cured in molds at about 140° C. for about 30 minutes at a specific pressure of about 25 kg./cm.$^2$ on the mold surface. In order to obtain best possible physical data, the elements are thereafter finally hardened for another 12 hours in a hot air chamber. The physical properties of these elements are as follows:

Tensile strength (DIN 53 504) _____ kg. cm.$^2$__ 380  
Breaking elongation (DIN 53 504) _____ percent__ 600  
Shore hardness A _____ 98  
Shore hardness D _____ 65  
Rebound elasticity (DIN 53 512) _____ percent__ 43  
DIN abrasion (DIN 53 516) _____ mm.$^3$__ 40

(Related to a natural rubber mixture for tire treads=100.)

EXAMPLE 2

About 500 parts of a storable reaction product prepared as indicated in Example 1 are mixed with about 195 parts of 4,4'-diamino-3,3'-diethyl-5,5'-dichlorodiphenyl methane and thereafter with about 250 parts of dimeric toluylene-2,4-diisocyanate. Vulcanization is carried out as in Example 1 and a product which has the following physical properties is obtained:

Tensile strength (DIN 53 504) _____ kg. cm.$^2$__ 280  
Breaking elongation (DIN 53 504) _____ percent__ 370  
Shore hardness A _____ 99  
Shore hardness D _____ 70  
Rebound elasticity (DIN 53 512) _____ percent__ 41  
DIN abrasion (DIN 53 516) _____ mm.$^2$__ 62

The physical data referred to are measured with a prepared mixture which, immediately after production, is placed in molds and cured. After storing this mixture for 3 and 7 days, respectively, at room temperature, test elements are again produced by curing in molds and like physical properties of the finished components are established, within the limits of error of the measurement methods being employed. The mixture filled the simple molds of the test elements and also complicated molds for industrial articles, such as small bearing bushings, just as completely as on the first day after preparation.

It is of course to be understood that the working examples are for the purpose of illustration and do not constitute limitations of the invention for the reason that any of the organic compounds containing active hydrogen atoms, organic polyisocyanates, or di-(4-aminophenyl)-methane derivatives set forth above may be utilized in place of the specific compounds used throughout the examples.

Although the invention has been described in considerable detail for the purpose of illustration, it is to be understood that variations can be made by those skilled in the art without departing from the spirit of the invention and the scope of the claims.

What is claimed is:

1. A method for producing elastomeric polyurethane plastics which comprises reacting a first organic compound containing active hydrogen atoms which are reactive with —NCO groups, said first organic compound having a molecular weight of at least about 1,000, a second organic compound containing active hydrogen atoms which are reactive with —NCO groups, said second organic compound having a molecular weight less than about 500 and an organic diisocyanate in an amount less than that required to react with all of the active hydrogen atoms present in said first and said second organic compounds to thereby prepare a storage stable intermediate and subsequently reacting said storage stable intermediate with an organic polyisocyanate and a di-(4-aminophenyl) methane derivative having the formula

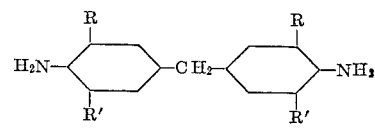

wherein R is an alkyl radical having from 1 to 4 carbon atoms and R' is a halogen atom, said organic polyisocyanate being present in an amount sufficient to react with all of the active hydrogen atoms present in the storage stable intermediate and the di-(4-aminophenyl) methane derivative.

2. A method for producing elastomeric polyurethane plastics which comprises reacting a first organic compound containing active hydrogen atoms which are reactive with —NCO groups, said first organic compound having a molecular weight of at least about 1,000, a second organic compound containing active hydrogen atoms which are reactive with —NCO groups, said second organic compound having a molecular weight less than about 500 and an organic diisocyanate in an amount less than that required to react with all of the active hydrogen atoms present in said first and said second organic compounds to thereby prepare a storage stable intermediate and subsequently reacting said storage stable intermediate with an organic polyisocyanate and from about 5% to about 80% by weight of a di-(4-aminophenyl) methane derivative having the formula

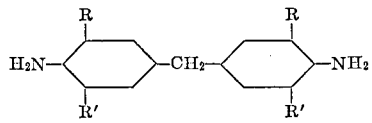

wherein R is an alkyl radical having from 1 to 4 carbon atoms and R′ is a halogen atom, said organic polyisocyanate being present in an amount sufficient to react with all of the active hydrogen atoms present in the storage stable intermediate and the di-(4-aminophenyl) methane derivative.

3. A method for producing elastomeric polyurethane plastics which comprises reacting a first organic compound containing active hydrogen atoms which are reactive with —NCO groups, said compounds having a molecular weight of at least about 1,000, a second organic compound containing active hydrogen atoms which are reactive with —NCO groups, said second organic compound having a molecular weight less than about 500 and an organic diisocyanate in an amount less than that required to react with all of the active hydrogen atoms present in said first and said second organic compounds to thereby prepare a storage stable intermediate and subsequently reacting said storage stable intermediate with an organic polyisocyanate and from about 10% to about 50% by weight of a di-(4-aminophenyl) methane derivative having the formula

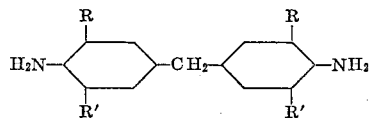

wherein R is alkyl radical having from 1 to 4 carbon atoms and R′ is a halogen atom, said organic polyisocyanate being present in an amount sufficient to react with all of the active hydrogen atoms present in the storage stable intermediate and the di-(4-aminophenyl) methane derivative.

4. A method for producing elastomeric polyurethane plastics which comprises reacting a first organic compound containing active hydrogen atoms which are reactive with —NCO groups, said compounds having a molecular weight of at least about 1,000 and selected from the group consisting of hydroxyl polyesters prepared by the process which comprises reacting a polyhydric alcohol with a polycarboxylic acid, polyhydric polyalkylene ethers, polyhydric polythioethers, polyesteramides, polyacetals and organic compounds containing activated methylene groups, a second organic compound containing active hydrogen atoms which are reactive with —NCO groups, said second organic compound having a molecular weight less than about 500 and an organic diisocyanate in an amount less than that required to react with all of the active hydrogen atoms present in said first and said second organic compounds to thereby prepare a storage stable intermediate and subsequently reacting said storage stable intermediate with an organic polyisocyanate and a di-(4-aminophenyl) methane derivative having the formula

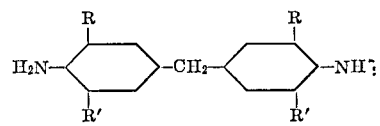

wherein R is an alkyl radical having from 1 to 4 carbon atoms and R′ is a halogen atom, said organic polyisocyanate being present in an amount sufficient to react with all of the active hydrogen atoms present in the storage stable intermediate and the di-(4-aminophenyl) methane derivative.

5. An elastomeric polyurethane plastic prepared by the process of claim 1.

6. A method of producing elastomeric polyurethane plastics in accordance with claim 1 wherein the first organic compound containing active hydrogen atoms is an hydroxyl polyester prepared by the process which comprises reacting a polyhydric alcohol with a polycarboxylic acid.

7. A method of producing elastomeric polyurethane plastics in accordance with claim 1 wherein the first organic compound containing active hydrogen atoms is a polyhydric polyalkylene ether.

8. A method for producing elastomeric polyurethane plastics in accordance with claim 1 wherein the organic isocyanate is toluylene diisocyanate.

9. A method for producing elastomeric polyurethane plastics in accordance with claim 1 wherein the organic isocyanate is 4,4′-diphenylmethane diisocyanate.

References Cited by the Examiner

UNITED STATES PATENTS

| | | | |
|---|---|---|---|
| 2,850,476 | 9/1958 | Seeger et al. | 260—850 |
| 2,905,652 | 9/1959 | Best et al. | 260—858 |
| 2,983,702 | 5/1961 | Little et al. | 260—858 |
| 3,014,894 | 12/1961 | Muller | 260—858 |
| 3,170,003 | 2/1965 | Grenski et al. | 260—858 |

OTHER REFERENCES

Garvin, J. Chem. Soc., 1955, pp. 83–89.

MURRAY TILLMAN, *Primary Examiner.*

LEON J. BERCOVITZ, WILLIAM H. SHORT,
*Examiners.*